Patented Mar. 19, 1940

2,194,362

UNITED STATES PATENT OFFICE 2,194,362

HYDROGENATION OF PROPIOLIC ACID AND ITS SALTS

Alexander Douglas Macallum, Niagara Falls, N. Y., assignor to E. I. du Pont de Nemours & Company, Wilmington, Del., a corporation of Delaware No Drawing. Application August 17, 1938, Serial No. 225,484

6 Claims. (Cl. 280—537)

This invention relates to a process for converting propiolic acid by hydrogenation.

It is known that propiolic acid can be reduced to propionic acid by the action of sodium amalgam. Applicant has found that propiolic acid and its salts can be readily reduced to propionic acid by direct pressure hydrogenation in the presence of a hydrogenation catalyst and that at the same time various dibasic and polybasic unsaturated or saturated organic acids of resinous and crystalline character, e. g. adipic acid, can be obtained as valuable by-products.

A convenient way of carrying out the process of the invention consists in subjecting a neutral aqueous solution of 27 g. sodium propiolate in about 225 cc. of water in the presence of 5 g. of an air-stabilized sodium-reduced nickel catalyst to the action of hydrogen at a pressure of about 60 to 200 lbs. and at about 60° C. until gas absorption is complete. In this way a 100% recovery of organic acids can be obtained, about 11% of which are non-volatile acids, including an appreciable amount of adipic acid, the rest being substantially propionic acid.

By increasing the amount of catalyst by about four times, the yield in dibasic and multibasic unsaturated acids can be increased to about the double amount.

The reaction conditions can be considerably varied without departing from the spirit of the invention. Thus, lower pressures can be used when the hydrogenation is carried out for a longer period of time. Also, higher pressures can be utilized without impairing the reaction. However, for practical use pressures varying from about 60 to 1500 pounds per square inch, preferably from about 60 to 200 pounds per square inch, during the hydrogenation have been found to be especially suitable. Any known hydrogenation catalysts can be used; however, nickel and cobalt have been found to be the most active catalysts for the process of the invention. With increasing amounts of catalysts increasing amounts of the valuable by-products are formed. Also, the reaction temperature is not critical, temperatures of about 50 to 80° C., however, being preferred.

The yields of the valuable by-products can be further enhanced when pretreating the mixture containing the alkali metal propiolate solution and the catalyst with oxygen. Thus a pretreatment of an aqueous solution of sodium propiolate containing nickel as a catalyst with oxygen for about 6 hours raises the yield of crude non-volatile acids to about 40 to 50%.

It has been found that the crude non-volatile acids recovered by the process of the present invention contain adipic acid, thus yielding an especially valuable dimerization product of propiolic acid.

The present invention is not restricted to any of the specific procedures described above, but is to be understood in its broad scope as defined in the claims. Although alkali metal salts of propiolic acid are preferred as starting material, propiolic acid or other salts of propiolic acid may be advantageously used.

I claim:

1. The method which comprises subjecting one of a group consisting of propiolic acid and its salts to direct pressure hydrogenation in the presence of a hydrogenation catalyst.

2. The method which comprises subjecting alkali metal propiolate in neutral solution to the action of hydrogen under pressure in the presence of a hydrogenation catalyst.

3. The method which comprises subjecting alkali metal propiolate in neutral solution to the action of hydrogen under a pressure of above about 60 pounds per square inch in the presence of a hydrogenation catalyst.

4. The method which comprises subjecting alkali metal propiolate in neutral solution to the action of hydrogen under a pressure of above about 60 pounds per square inch in the presence of a hydrogenation catalyst selected from the group consisting of nickel and cobalt.

5. The method which comprises subjecting a solution of an alkali metal propiolate containing a hydrogenation catalyst to substantial oxidation by the action of oxygen and then subjecting it to the action of hydrogen under pressure.

6. The method which comprises subjecting a solution of an alkali metal propiolate containing a hydrogenation catalyst selected from the group consisting of nickel and cobalt to substantial oxidation by the action of oxygen and then subjecting the said mixture to the action of hydrogen at a pressure of about 60 to 200 pounds at a temperature of about 50 to 80° C. until absorption of hydrogen is complete.

ALEXANDER DOUGLAS MACALLUM.